Patented Apr. 25, 1933

1,905,537

UNITED STATES PATENT OFFICE

CHARLES S. WEBBER, OF SPRINGFIELD, MASSACHUSETTS, AND CYRIL J. STAUD, OF ROCHESTER, NEW YORK, ASSIGNORS TO EASTMAN KODAK COMPANY, OF ROCHESTER, NEW YORK, A CORPORATION OF NEW YORK

PROCESS FOR THE HYDROLYSIS OF CELLULOSE ACETATE

No Drawing.        Application filed December 14, 1929. Serial No. 414,209.

This invention relates to the hydrolysis of cellulose acetate and particularly to the hydrolysis of this ester in the presence of 1-4 dioxan and an organic acid at elevated temperatures.

The manufacture of cellulose acetate for use in the various products for which it has been found suitable requires first that the cellulose be acetylated in the usual acetylating bath to a cellulose triacetate. This ester, however, is insoluble or only slightly soluble in chloroform but is always soluble in alcohol-chloroform. Films formed from a chloroform solution of the cellulose triacetate or, if the triacetate be but soluble in chloroform and alcohol, from the latter solution produces a film which is very brittle and with little tensile strength. It, therefore, is not suitable for photographic or lacquer purposes and, moreover, has been little used in other arts.

In order to render this cellulose triacetate more flexible, it has been long known that hydrolysis of the cellulose triacetate to a cellulose acetate from which part of the acetyl radicals have been removed and which is soluble in acetone, will result in a product having superior flexibility and tensile strength. In the manufacture of cellulose acetate, therefore, this hydrolysis is a very important step and must be carried out carefully with accurate control in order that a cellulose acetate having the desired solubility and physical properties result. Careless hydrolysis of the cellulose acetate will produce a product having no advantages over the cellulose triacetate from which it has been hydrolyzed.

Cellulose triacetate, as first produced, may be in either the fibrous form or dissolved in the acetylating solution according to the type of acetylating bath in which the esterification has been conducted. In order to hydroylze the non-fibrous triacetate of cellulose, it is usually treated in the acetylating bath by the addition of water to destroy the activity of the uncombined acetic anhydride and a further addition of a suitable catalyst after which the bath is held at a temperature of about 50° C., or thereabouts until the cellulose triacetate has been deacetylated to the required amount. If a precipitated cellulose triacetate or a fibrous cellulose triacetate is being hydrolyzed, this product is first dissolved, for example, in acetic acid and hydrolysts, such as water and a mineral acid catalyst added thereto, the subsequent treatment being similar to the treatment of the dissolved acetate.

An object of the present invention is to provide a new process for the hydrolysis of cellulose triacetate. A further object of this invention is to so treat the chloroform-soluble cellulose acetate with a hydrolyzing bath containing 1-4 dioxan and an organic acid, that an acetone-soluble product will result. Other objects will hereinafter appear.

We have found, as is stated in our copending application Serial No. 414,206, filed on even date with this application, that 1-4 dioxan, when diluted with water, acts as a solvent for cellulose triacetate whether it be a precipitated triacetate or a cellulose triacetate in the fibrous form. We have made the surprising discovery that the use of this solvent mixture for cellulose triacetate in conjunction with organic acids, either of the aliphatic or aromatic series, when used as a hydrolyzing bath for cellulose triacetate will hydrolyze it to any desired degree of deacetylation when the reaction is conducted at an elevated temperature. While almost all organic acids exhibit a very slight hydrolytic effect, we have found that, at elevated temperatures, the organic acids do bring about the hydrolysis with a fair degree of rapidity which can be accurately and thoroughly controlled.

As 1-4 dioxan

has a boiling point of approximately 100° C., solutions of it containing the cellulose triacetate, water and organic acids may conveniently be heated to that temperature thereby accelerating the reaction. We have found it desirable, therefore, to heat the hydrolyzing bath containing these ingredients under a reflux condenser or similar condensing means whereby the 1-4 dioxan and water which evaporates during the hydrolyzing reaction are condensed and returned to the hydrolyzing mass. The temperature at which this hydrolysis takes place, approximately 100° C., appears to have little degrading action upon the acetone-soluble cellulose acetate produced due, no doubt, to the uniform heat conditions and the thorough ebullition and resultant stirring of the hydrolyzing mass by the distillation therefrom of the 1-4 dioxan. This was an entirely unexpected result as it has been a supposedly settled axiom that good quality acetate could not be obtained by such temperature treatment.

The presence of an organic acid in the hydrolyzing bath aids considerably in controlling the uniformity of the product resulting from hydrolyzing the cellulose triacetate in this manner. The organic acids which we have found suitable for affecting hydrolysis of the cellulose acetate include such acid as lactic, tartaric, racemic, malic, glycollic, glyceric, pyruvic, alpha-keto butyric, alpha-keto valeric, alpha-keto-caproic, malonic, succinic, benzoic, mandelic, glutonic, and in fact any organic acid which has greater activity than acetic acid which has an ionization constant of $1.82 \times 10^{-5}$. Such an organic acid would, of course, have an ionization constant greater than $1.82 \times 10^{-5}$. By the use of such acids other than the usual acetic acid for this purpose, it is possible to choose an acid which often, due to its low cost, enables one to reduce the manufacturing expense incident to production of the cellulose acetate without decreasing the good qualities of that product.

We shall now give an example for the carrying out of our invention, but it will be distinctly understood that we are not to be limited by the proportions or ingredients therein given, except as they are indicated in the appended claims. Fifty parts of cellulose triacetate, either of the fibrous or precipitated form or any such triacetate which has been separated from the original esterifying bath, are dissolved in 100 parts of 1-4 dioxan, 10 parts of water and 50 parts of 85% lactic acid or equivalent acid. After a solution has been effected, the mass is placed in a suitable container to which a reflux condenser or similar condensing means is attached and the whole refluxed at a temperature of 100° C., until a product is obtained which has the desired acetyl content. This point may readily be determined by removal of a test portion from the hydrolyzing bath and after precipitation and washing, ascertaining the acetyl value or its solubility in the desired solvent.

It may be that a slight percentage of the organic acid will have combined with the cellulose acetate or displaced some of the acetyl that has been removed therefrom. But we have been unable to detect any bad effects due to the presence of such a group in addition to the acetyl groups upon the cellulose. If the deacetylation, of course, be carried below acetone-solubility, such a substitution of the other organic acid may be of considerable importance. For usual purposes, however, such an extended hydrolysis of the cellulose acetate is not required.

It is evident that hydrolysis of the cellulose triacetate may be effected at temperatures below 100° C., which are still fairly elevated temperatures and that various organic acids which are compatible with the hydrolyzing bath may be employed, together with the 1-4 dioxan without in any way departing from this invention or sacrificing any of the advantages that may be derived therefrom.

Having thus described our invention, what we claim as new and desire to be secured by Letters Patent of the United States is:

1. In the process for the production of acetone-soluble cellulose acetate, the step which comprises hydrolyzing the cellulose acetate in the presence of 1-4 dioxan and an organic acid at a temperature of approximately 100° C.

2. In the process for the production of acetone-soluble cellulose acetate, the step which comprises hydrolyzing the cellulose acetate in the presence of 1-4 dioxan and an organic acid having an ionization constant greater than $1.9 \times 10^{-5}$.

3. In the process for the production of acetone-soluble cellulose acetate, the step which comprises hydrolizing a cellulose acetate in a bath comprising 1-4 dioxan and lactic acid.

4. In the process for the production of acetone-soluble cellulose acetate, the step which comprises hydrolizing the cellulose acetate in a bath comprising 1-4 dioxan, an organic acid and water at a temperature of approximately 100° C.

5. In the process for the production of acetone-soluble cellulose acetate, the step which comprises hydrolyzing cellulose acetate in a bath comprising 1-4 dioxan and an organic acid by refluxing the bath at a temperature of approximately 100° C.

6. In the process for the production of acetone-soluble cellulose acetate, the step which comprises hydrolyzing cellulose acetate in a bath comprising 1-4 dioxan, lactic acid and water by refluxing the mass at approximately 100° C. until the desired hydrolysis has been effected.

Signed at Springfield, Mass., this 3rd day of December, 1929.

CHARLES S. WEBBER.

Signed at Rochester, New York, this 6th day of November, 1929.

CYRIL J. STAUD.